United States Patent
Chatterjee et al.

(10) Patent No.: US 8,588,383 B2
(45) Date of Patent: Nov. 19, 2013

(54) FREQUENCY CAPPING AND THROTTLING OF CALLS IN A PAY-PER-CALL ADVERTISING SOLUTION

(75) Inventors: Surojit Chatterjee, Fremont, CA (US);
Anshul Kothari, Sunnyvale, CA (US);
Chen Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 12/971,195

(22) Filed: Dec. 17, 2010

(65) Prior Publication Data

US 2012/0155624 A1 Jun. 21, 2012

(51) Int. Cl.
*H04M 15/00* (2006.01)

(52) U.S. Cl.
USPC .............. 379/114.05; 379/201.01; 455/414.1; 709/217

(58) Field of Classification Search
USPC ............................................. 379/114.01–132
See application file for complete search history.

(56) References Cited

U.S. PATENT DOCUMENTS

| | | | |
|---|---|---|---|
| 2007/0214044 A1* | 9/2007 | Lee ................................. | 705/14 |
| 2008/0005268 A1* | 1/2008 | Chen ............................ | 709/217 |
| 2008/0270164 A1* | 10/2008 | Kidder et al. ..................... | 705/1 |
| 2009/0041219 A1* | 2/2009 | Rauba et al. ............. | 379/201.12 |
| 2009/0132346 A1* | 5/2009 | Duggal et al. ................... | 705/10 |
| 2009/0265220 A1* | 10/2009 | Bayraktar et al. ............... | 705/10 |
| 2009/0325547 A1* | 12/2009 | Nath et al. .................. | 455/414.1 |
| 2010/0002606 A1* | 1/2010 | Preis et al. ..................... | 370/259 |
| 2010/0228593 A1* | 9/2010 | Belwadi et al. ................. | 705/10 |

OTHER PUBLICATIONS (GEDDES) How to Raise Your Call-Through Rate Without Reducing Your Click-Through Rate [retrieved on Feb. 21, 2012] Retrieved from teh Internet: <URL: http://searchengineland.com/how-to-raise-your-call-through-rate-without-reducing-your-click-through-rate-46658> Jul. 19, 2010 entire document.*

* cited by examiner

*Primary Examiner* — Duc Nguyen
*Assistant Examiner* — Ibraham Sharifzadeh
(74) *Attorney, Agent, or Firm* — Hall Estill Law Firm

(57) ABSTRACT

Various methods, systems, and computer program products are disclosed for controlling a number of calls based on promotional message impressions. The method may include receiving a request to communicate at least one promotional message, wherein the at least one promotional message is associated with one or more phone numbers. The method may include communicating the at least one promotional message and the one or more phone numbers. The method may include receiving one or more calls associated with the at least one promotional message. The method may include determining a call through rate for the at least one promotional message based on the one or more calls. The method may include determining a number of impressions of the at least one promotional message based on the determined call through rate.

25 Claims, 4 Drawing Sheets

FREQUENCY CAPPING AND THROTTLING OF CALLS IN A PAY-PER-CALL ADVERTISING SOLUTION

FIELD OF THE INVENTION

The disclosure relates to communicating promotional messages to computing device(s) and in particular to controlling a number of calls based on promotional message impressions.

BACKGROUND OF THE INVENTION

Conventional systems fail to provide entities such as advertisers an effective mechanism to control the number of calls they receive from advertising. As a result, advertisers may receive too many or too few calls than is desirable. For example, a high volume of calls that the advertiser cannot handle may lead to an increase in the average wait time for a consumer. On the other hand, too few calls may lead to lackluster sales and/or service. What is needed is a system and method that controls the number of calls that an advertiser receives from advertising such that the advertiser can receive a desirable number of calls. These and other problems exist.

SUMMARY OF THE INVENTION

Various systems, computer program products, and methods for controlling a number of calls based on promotional message impression(s) are described herein.

According to various implementations of the invention, the method may include controlling a number of calls based on promotional message impressions. The method may include receiving a request to communicate at least one promotional message, wherein the at least one promotional message is associated with one or more phone numbers. The method may include communicating the at least one promotional message and the one or more phone numbers. The method may include receiving one or more calls associated with the at least one promotional message. The method may include determining a call through rate for the at least one promotional message based on the one or more calls. The method may include determining a number of impressions of the at least one promotional message based on the determined call through rate.

According to various implementations of the invention, the method may include determining a call quality based on the received one or more calls. In some implementations, determining a call quality may include determining an average wait time for the received one or more calls or a number of disconnected ones of the received one or more calls. In some implementations, the method may include determining a number of impressions based on the determined call quality.

According to various implementations of the invention, the method may include controlling a number of calls based on promotional message impressions. The method may include receiving a request to communicate at least one promotional message, wherein the at least one promotional message is associated with one or more phone numbers, and wherein the request comprises a number or rate of calls to be received resulting from the at least one promotional message. The method may include communicating the at least one promotional message and the one or more phone numbers. The method may include receiving one or more calls associated with the at least one promotional message. The method may include determining whether the requested number or rate of calls has been achieved based on the one or more calls. The method may include determining a call through rate for the at least one promotional message based on the one or more calls. The method may include determining a number of instances to communicate the one or more phone numbers based on the determined call through rate when the requested number or rate of calls has not been achieved.

DETAILED DESCRIPTION OF THE INVENTION

Figure 1:
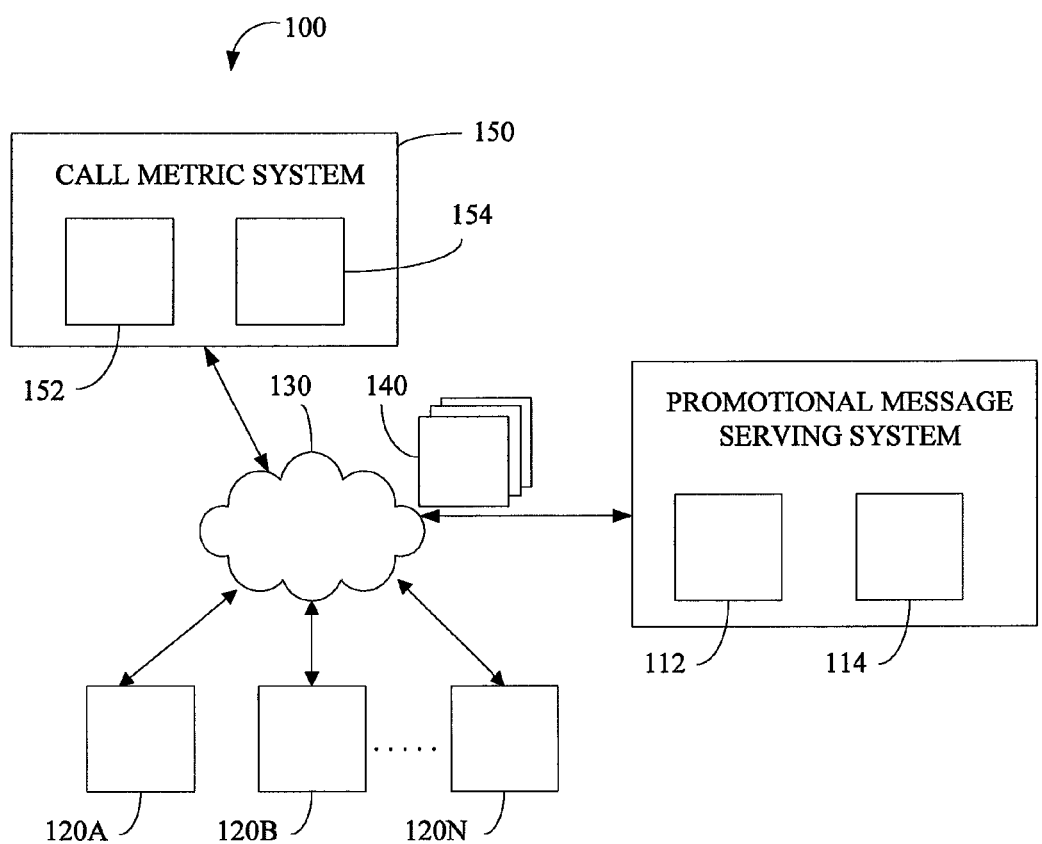
FIG. 1 is a block diagram illustrating a system of controlling a number of calls based on promotional message impression(s), according to various implementations of the invention.

FIG. 1 is a block diagram illustrating a system 100 of controlling a number of calls based on promotional message impression(s), according to various implementations of the invention. According to various implementations of the invention, system 100 may include, but is not limited to, a promotional message serving system 110, a call metric system 150 and a computing device 120 (illustrated in FIG. 1 as a plurality of computing devices 120A, 120B, 120N). In some implementations of the invention, promotional message serving system 110, call metric system 150 and computing device 120 may be coupled to one another via a network 130. Network 130 may include a Local Area Network, a Wide Area Network, a cellular communications network, a Public Switched Telephone Network, and/or other network or combination of networks.

According to various implementations of the invention, promotional message serving system 110 may include processor 112, memory 114, and/or other components that facilitate the functions of the promotional message serving system 110 described herein. In some implementations, processor 112 includes one or more processors configured to perform various functions of promotional message serving system 110. In some implementations, memory 114 includes one or more tangible (i.e., non-transitory) computer readable media. Memory 114 may include one or more instructions that when executed by processor 112 configure processor 112 to perform the functions of promotional message serving system 110. In some implementations, memory 114 may include one or more instructions stored on tangible computer readable media that when executed at a remote device, such as computing device 120, cause the remote device to display promotional messages, web pages, and/or other content associated with an entity, as described herein.

According to various implementations of the invention, call metric system 150 may include processor 152, memory 154, and/or other components that facilitate the functions of the call metric system 150 described herein. In some implementations, processor 152 includes one or more processors configured to perform various functions of call metric system 150. In some implementations, memory 154 includes one or more tangible (i.e., non-transitory) computer readable media. Memory 154 may include one or more instructions that when executed by processor 152 configure processor 152 to perform the functions of call metric system 150. In some implementations, memory 154 may include one or more instructions stored on tangible computer readable media that when executed at a remote device, such as computing device 120, cause the remote device to display at least one report, as described herein.

In some implementations, while promotional message serving system 110 and call metric system 150 have been depicted as separate systems in FIG. 1, it will be appreciated that these systems may be included in one or more systems configured to individually or together perform the functions associated with promotional message serving system 110 and call metric system 150 described herein.

According to various implementations of the invention, computing device 120 may include a computing device such as a desktop computer, a laptop computer, a cellular telephone, a personal digital assistant, a tablet computing device, and/or other computing device on which promotional messages, web pages, and/or other content associated with the entity may be displayed.

In some implementations of the invention, promotional message serving system 110 may receive a first request to communicate at least one promotional message. In some implementations, the first request may be received from an entity associated with the at least one promotional message. In some implementations, the entity may include an advertiser, retailer and/or any other entity associated with the at least one promotional message. For example, an entity may include an advertiser that wishes to communicate a promotional message such as an advertisement to a user. In this example, promotional message serving system 110 may receive the advertisement to be communicated to a user on behalf of the advertiser at an appropriate time (such as, without limitation, alongside search engine results, within a webpage, or within a graphical user interface).

In some implementations, the at least one promotional message may be associated with one or more phone numbers. In some implementations, the one or more phone numbers may be associated with the entity with which the at least one promotional message is associated. In these implementations, for example, the one or more phone numbers may include a phone number of an advertiser such as a phone number of a retail location. In some implementations, the one or more phone numbers may be mapped to the advertiser's phone numbers. In these implementations, for example, the one or more phone numbers may include a phone number that connects to a call center, such as call metric system 150, and that is mapped to the advertiser's phone number. In some implementations, the one or more phone numbers may be associated with a different entity (for example, a phone directory service) that has knowledge of the advertiser's phone numbers and may map the one or more phone numbers to the advertiser's phone numbers.

In some implementations, promotional message serving system 110 may communicate the at least one promotional message and the associated one or more phone numbers in response to a second request associated with a computing device 120. In some implementations of the invention, the second request includes a request for promotional messages, web pages and/or other electronic content to be communicated to computing device 120. In some implementations, the second request may be related to an application or other process executing at computing device 120. In some implementations, the second request includes one or more search terms (i.e., keywords) from an operator/user of computing device 120 entered into a search engine. The search engine may be a web-based search engine and/or a search engine that searches a hard drive or other component of computing device 120. In some implementations, the second request may be related to an application such as a gaming or other application being displayed at computing device 120. For example, the second request may include a login to an online gaming application accessed using computing device 120. In some implementations, the second request may include location information that indicates a geographic location of computing device 120 (for example, in case the computing device is a portable computing device). Other types of second requests related to applications and/or processes executing at computing device 120 may be received by promotional message serving system 110 as would be appreciated.

In some implementations of the invention, the second request may include one or more keywords entered by a user of computing device 120. In some implementations, based on the second request (i.e., the one or more keywords), promotional message serving system 110 may identify at least one promotional message to be communicated to and be displayed at computing device 120. In some implementations, promotional message serving system 110 may communicate the identified at least one promotional message and the one or more phone numbers associated with the promotional message. In some implementations, the one or more phone numbers may be included in the at least one promotional message such that the at least one promotional message and the one or more phone numbers are displayed at computing device 120.

In some implementations, promotional message serving system 110 may generate one or more responses 140 to be communicated to and be displayed at computing device 120. In some implementations, a response may include a promotional message associated with an entity, a web page associated with an entity, a landing page associated with an entity, and/or other responses. In some implementations, the entity may include an advertiser, retailer and/or any other entity that is associated with the response. For example, promotional message serving system 110 may generate one or more responses related to: keywords entered by the operator of computing device 120 (such as florist advertisements when the user searches for "online flowers"); a gaming application being played by the operator of computing device 120 (such as a response related to other gaming applications or upgrades to the gaming application being played); the location of computing device 120 (such as advertisements from retailers within walking distance of computing device 120, i.e., in case the computing device is a portable computing device); and/or other responses related to the second request from computing device 120.

In some implementations, a response may be associated with one or more phone numbers. In some implementations, the one or more phone numbers may be associated with the same entity (for example, an advertiser) with which the response is associated. In some implementations, the one or more phone numbers may be mapped to the advertiser's phone numbers. In some implementations, the one or more phone numbers may be associated with a different entity that has knowledge of the advertiser's phone numbers and may map the one or more phone numbers to the advertiser's phone numbers.

In some implementations of the invention, promotional message serving system 110 may generate a response 140 to the second request associated with computing device 120. In some implementations, the one or more phone numbers associated with the response and/or entity may be included in any type of response. For example, a promotional message (for example, an advertisement) may be displayed to user of computing device 120. The user may click on or otherwise select the advertisement which may cause a website associated with the entity to be displayed. The website may have any number of web pages and landing pages associated with it. As such, the one or more phone numbers may be included in the promotional message or any of the web pages and landing pages associated with the website.

In some implementations, the entity may incorporate one or more instructions such as java script code in the website such that when a user selection causes the website to be displayed, the associated one or more phone numbers may be displayed on the website. In other words, when the website is visited, the code is executed and causes the associated one or more phone numbers to be inserted in the web page/landing page. As such, when the web page/landing page is displayed at computing device 120, the associated one or more phone numbers is also displayed. As would be appreciated, other scripting languages may be used as long as the code causes the phone number to be inserted/displayed.

In some implementations of the invention, promotional message serving system 110 may communicate the response to a third party that subsequently communicates the response to computing device 120. In some implementations of the invention, promotional message serving system 110 may communicate the response directly to computing device 120.

In some implementations, the promotional messages may include, but is not limited to, one or more advertisements, one or more coupons, and/or other promotional/marketing content. In some implementations, promotional messages may include various types of formats such as text, image, video, audio, other formats suitable to convey promotional messages, and/or any combination of formats.

As used herein, "selecting" or "selection of" a promotional message includes, but is not limited to, clicking with a finger, a stylus, or other object; shaking or tapping computing device 120 (in the case where the computing device is portable, for example); uttering a verbal command; and/or taking any other action in relation to computing device 120 to indicate a selection of a promotional message.

In some implementations, call metric system 150 may receive one or more calls associated with the at least one promotional message and/or response. For example, call metric system 150 may receive a phone call from a user that called a phone number that is displayed on an advertisement, landing page, or other content associated with the advertisement. In some implementations, call metric system 150 may track the received one or more calls and determine a call through rate for the at least one promotional message, response and/or entity based on the received one or more calls. In some implementations, call metric system 150 may determine the call through rate each time a call is received by call metric system 150. In other implementations, call metric system 150 may determine the call through rate at intervals (such as every 50 calls, every hour, and/or other interval).

In some implementations, call metric system 150 may track the received one or more calls by determining that the one or more phone calls resulted from the at least one promotional message. In other words, call metric system 150 may determine that a call originated from a promotional message such as an advertisement, thereby attributing the call to the promotional message. In this manner, a call through rate may be determined.

In some implementations, a promotional message may be associated with a phone number before the promotional message and the phone number are communicated. In these implementations, the one or more calls may be tracked using the association. The association may be stored in a memory such as memory 154 of call metric system 150. Accordingly, when a user calls the phone number, call metric system 150 may determine that the one or more calls originated from the promotional message based on the association between the phone number and the promotional message. In some implementations, the promotional message when communicated may include or when selected may cause a phone number to be displayed. Thus, a user may call the phone number after viewing the promotional message. Because the promotional message and the phone number are associated with one another, call metric system 150 may determine that the phone call resulted from the promotional message. In this manner, a call through rate may be determined based on the association.

In some implementations, a promotional message may be associated with an entity such as an advertiser and a phone number may be associated with the entity. In these implementations, the one or more calls may be tracked by correlating when the promotional message was communicated and when a phone call associated with the phone number was received. As would be appreciated, for example, based on the time that the promotional message was communicated and the time that the phone call was received, various statistical analyses may be performed to determine that the phone call is correlated with (i.e., resulted from) the promotional message being communicated. In this manner, a call through rate may be determined based on the correlation.

In some implementations, the call through rate may be determined by dividing a number of calls received by the entity in response to the at least one promotional message by the number of times the at least one promotional message is communicated. In some implementations, the call through rate may include a prediction of a number of calls that the entity is likely to receive for the at least one promotional message. In some implementations, the prediction may be based on a number of prior calls that the entity has received for the at least one promotional message and the number of impressions of the at least one promotional message that have been displayed for the entity. For example, if one call is received for every 100 impressions of the promotional message, the call through rate may be determined as one percent, and accordingly results in a probability, p=0.01, that one call will be received per every 100 impressions.

In some implementations, call metric system 150 may determine a number of impressions of the at least one promotional message to be performed based on the determined call through rate. For example, an entity may wish to receive 50 calls per day. Call metric system 150 may determine a call through rate equal to 0.05 (i.e., five calls per 100 impressions) for a promotional message. In this example, call metric system 150 may determine that a total of 1,000 impressions should be made per day so that the desired 50 calls per day are achieved.

In some implementations, determining a number of impressions may include increasing a number of impressions of the at least one promotional message to be communicated based on the determined call through rate. For example, as calls are received, call metric system 150 may revise the call through rate down to 0.01 such that the total number of impressions in a given day or other interval should be increased in order to receive the desired 50 call per day.

In some implementations, determining a number of impressions may include decreasing a number of impressions of the at least one promotional message to be communicated based on the determined call through rate. For example, as calls are received, call metric system 150 may revise the call through rate up to 0.10 such that the total number of impressions in a given day or other interval should be decreased in order to receive the desired 50 calls per day.

In some implementations, determining a number of impressions may include determining whether to continue to communicate the at least one promotional message. In some implementations, determining a number of impressions may include discontinuing at least one impression of the at least one promotional message.

In some implementations, the first request associated with the entity may include an indication of a predefined number of calls. In some implementations, the indication may include an indication of a rate of calls that the entity would like to receive per time period such as per day, per week, per minute, etc. For example, the entity may wish to receive 50 calls per day so that when 50 calls to the entity have been received, the one or more promotional messages of the entity will no longer be communicated (until the next day). In some implementations, the indication may include an indication of a predefined maximum number of calls that the entity would like to receive for the at least one promotional message (i.e., a call cap). For example, the entity may wish to receive 1000 total calls so that when 1000 total calls to the entity have been received, the one or more promotional messages of the entity will no longer be communicated.

In some implementations, the indication may include an indication of a predefined number of calls that the entity would like to receive using the one or more phone numbers. In these implementations, the entity may control a number of calls to the entity generally resulting from promotional messages.

In some implementations, the indication may include an indication of a predefined number of calls that the entity would like to receive using a particular phone number such as a phone number of a particular department, office, operator, or other party of the entity. In these implementations, the entity may control a number of calls to particular parties of the entity. For example, a first department of the entity may be able to handle more calls than a second department.

In some implementations, determining a number of impressions for the at least one promotional message may include determining whether a number of received one or more calls exceeds the predefined number of calls included in the first request. In some implementations, call metric system 150 may determine whether to continue to communicate the at least one promotional message based on whether the predefined number of calls is exceeded. For example, the entity may indicate that it would like to receive 100 calls per day. Call metric system 150 may track the number of calls received and may make a determination to continue to communicate the at least one promotional message if the number of received calls has not reached or exceeded 100 calls. Call metric system 150 may make a determination to discontinue communication of the at least one promotional if the number of received calls has reached or exceeded 100 calls.

In some implementations, call metric system 150 may determine the number of impressions for the at least one promotional message based on the determined call through rate and the predefined number of calls included in the first request. For example, an entity may indicate that it would like to receive 100 calls per day (i.e., the predefined number of calls is 100). Call metric system 150 may receive one or more calls and may determine that the call through rate is 90 percent (i.e., 90 calls are received for every 100 impressions). Because the entity would like to receive a total of 100 calls out of which 90 calls have already been received, call metric system 150 may determine that approximately 11 more impressions may be performed (as the entity can receive 10 more calls). Similarly, if the call through rate is determined to be 10 percent (i.e., 10 calls are received for every 100 impressions), call metric system may determine that approximately 900 more impressions may be performed because the entity would like to receive 90 more calls.

In some implementations, once the predefined number of calls (for example, 100 calls) is reached or exceeded, call metric system 150 may discontinue at least one impression of the at least one promotional message. In some implementations, call metric system 150 may make a determination to continue to communicate the at least one promotional message as long as the predefined number of calls has not been reached or exceeded.

In some implementations, call metric system 150 may determine whether to continue to communicate the one or more phone numbers associated with the at least one promotional message based on the determined call through rate and/or the predefined number of calls. In some implementations, call metric system 150 may make a determination to continue to communicate the one or more phone numbers if the determined call through rate is low. In some implementations, once the predefined number of calls (for example, 100 calls) is reached or exceeded, call metric system 150 may discontinue communication of the one or more phone numbers associated with the at least one promotional message. In some implementations, call metric system 150 may make a determination to continue to communicate the one or more phone numbers associated with the at least one promotional message as long as the predefined number of calls has not been reached or exceeded.

In some implementations, determining whether to continue to communicate the one or more phone numbers may include determining whether to continue to communicate the one or more phone numbers with the at least one promotional message based on the determined call through rate and/or the predefined number of calls. In some implementations, call metric system 150 may continue to communicate the at least one promotional message but may discontinue communication of the one or more phone numbers with the at least one promotional message. In some implementations, determining whether to communicate the one or more phone numbers may include determining whether to continue to communicate the at least one promotional message.

Figure 3:
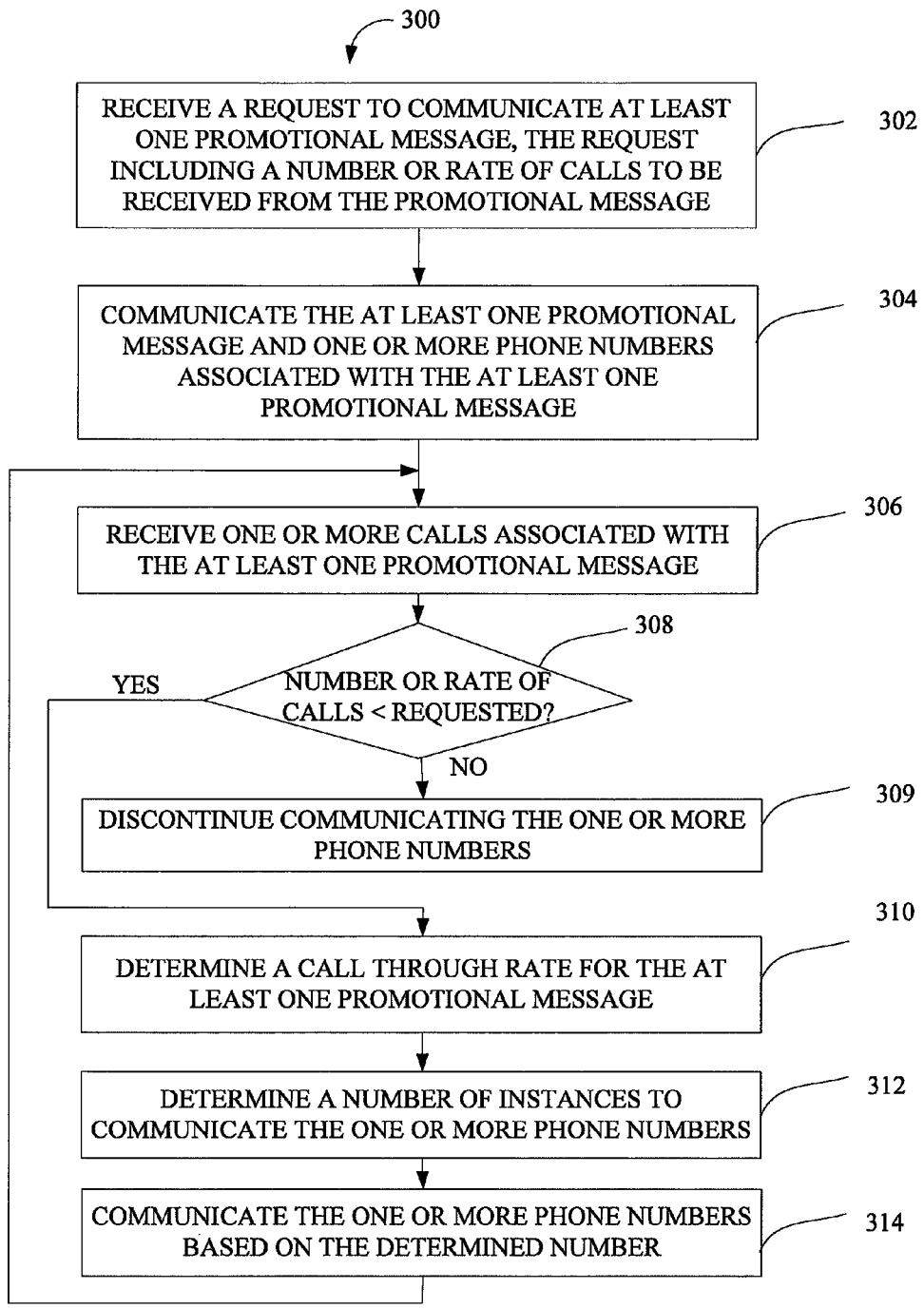
FIG. 3 is a flow diagram illustrating an example process of controlling a number of calls, according to various implementations of the invention.

In some implementations, call metric system 150 may determine whether to continue to communicate the one or more phone numbers based on process 300 as illustrated in FIG. 3, for example.

In some implementations, call metric system 150 may determine a call quality based on the received one or more calls. Call quality may refer to a user's experience when he/she calls the phone numbers associated with the one or more calls. In some implementations, determining a call quality may include determining an average wait time for the received one or more calls or disconnected ones of the received one or more calls. In some implementations, determining a call quality may include determining a voice quality associated with the received one or more calls. In some implementations, the number of impressions for the at least one promotional message may be further based on the determined call quality. For example, if call metric system 150 determines that the call quality has deteriorated (i.e., the average wait time has increased, for example), call metric system 150 may decrease the number of the impressions for the at least one promotional message and vice versa.

In some implementations, call metric system 150 may establish one or more calls between one or more callers (associated with computing devices 120, for example) and an entity associated with the at least one promotional message/ website based on the received calls. In some implementations, establishing a call may include forwarding the call to the entity, dialing the entity and bridging the call, etc.

In some implementations, call metric system 150 may generate at least one report. In some implementations, the report may include, among other things, the number of received calls for a promotional message and/or entity, the call through rate for the promotional message and/or entity, the number of impressions of the promotional message communicated/displayed, the number of impressions of the promotional message that can be communicated based on the call through rate and/or predefined number of calls. In some implementations, the report may include other metrics associated with the calls and/or impressions as would be appreciated.

In some implementations, call metric system 150 may receive a request for the report from an advertiser or other entity. In response to the request, call metric system 150 may generate the report and communicate the report to a remote computing device used by an advertiser (not otherwise illustrated in FIG. 1).

Figure 2:
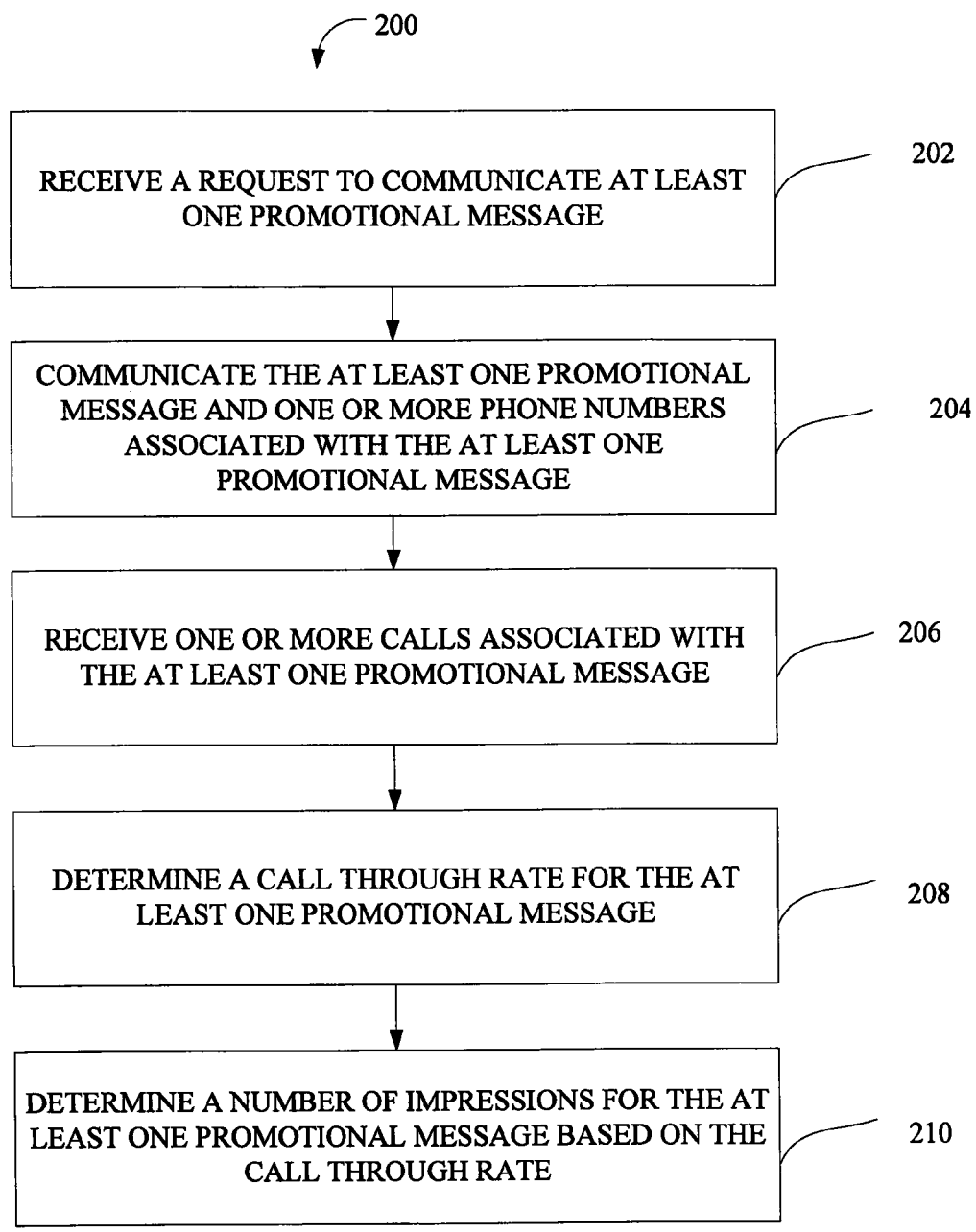
FIG. 2 is a flow diagram illustrating an example process of controlling a number of calls, according to various implementations of the invention.

FIG. 2 is a flow diagram illustrating an example process 200 of controlling a number of calls, according to various implementations of the invention. The various processing operations and/or data flows depicted in FIG. 2 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, process 200 may receive a request to communicate at least one promotional message in operation 202. In some implementations, the request may be received from an entity associated with the at least one promotional message. In some implementations, the entity may include an advertiser, retailer and/or any other entity associated with the at least one promotional message. In other words, an entity may include an entity that wishes to communicate a promotional message.

In an operation 204, process 200 may communicate the at least one promotional message and one or more phone numbers associated with the at least one promotional message. In some implementations, the at least one promotional message and the associated one or more phone numbers may be communicated in response to, for example, a search request from a user.

In an operation 206, process 200 may receive one or more calls associated with the at least one promotional message. In an operation 208, process 200 may determine a call through rate for the at least one promotional message based on the received one or more calls. In an operation 210, process 200 may determine a number of impressions of the at least one promotional message based on the determined call through rate. In some implementations, process 200 may determine how many more impressions of the at least one promotional message may be communicated to the user based on the determined call through rate and/or a predefined number of calls indicated by an entity associated with the at least one promotional message. In some implementations, process 200 may determine whether to increase or decrease the number of impressions of the at least one promotional message based on the determined call through rate and/or a predefined number of calls indicated by an entity associated with the at least one promotional message. In some implementations, process 200 may determine whether to communicate the at least one promotional message based on the determined call through rate and/or the predefined number of calls. In some implementations, process 200 may determine whether to communicate at least one impression of the at least one promotional message based on the determined call through rate and/or the predefined number of calls. In some implementations, process 200 may determine to discontinue communication of at least one impression of the at least one promotional message based on the determined call through rate and/or the predefined number of calls.

FIG. 3 is a flow diagram illustrating an example process 300 of controlling a number of calls, according to various implementations of the invention. In some implementations of the invention, in an operation 302, process 300 may receive a request to communicate at least one promotional message, where the request includes a number or rate of calls to be received resulting from the communicated at least one promotional message. In some implementations, the request may be received from an entity wishing to receive the predefined number or rate of calls resulting from the at least one promotional message. In some implementations, the entity may include an advertiser, retailer and/or any other entity associated with the at least one promotional message.

In some implementations, the requested number or rate of calls may be based on time of day, geographic location of computing device 120, and/or other factors.

In some implementations, the number of rate of calls may not be predefined or requested by the entity. In these implementations, call metric system 150 may dynamically determine a desired number or rate of calls that would result in a desirable user call experience (e.g., least wait time, dropped calls, etc.).

In an operation 304, process 300 may communicate the at least one promotional message and one or more phone number associated with the at least one promotional message. In some implementations, the at least one promotional message and the associated one or more phone numbers may be communicated to computing device 120 in response to, for example, a search request from a user of computing device 120.

In an operation 306, process 300 may receive one or more calls associated with the at least one promotional message. In some implementations, for example, process 300 may add the number of the one or more calls to the number of calls already received to determine a total number of calls. In other implementations, for example, process 300 may determine that within the past hour 57 calls have already been received and an additional received call results in a rate of 58 calls per hour in the past hour.

In an operation 308, process 300 may determine whether the number or rate of phone calls is less than the requested/desired number or rate of phone calls. For example, process 300 may determine a number or rate of phone calls based on the number of the received one or more phone calls.

In operation 308, when the number or rate of calls is not less than (i.e., is equal to or exceeds) the requested/desired number or rate of phone calls, process 300 proceed to an operation 309, where process 300 may discontinue communicating the one or more phone numbers in an operation 309. In some implementations, process 300 discontinues communicating the one or more phone numbers by discontinuing communication of the at least one promotional message. In other words, process 300 may no longer cause impressions of the at least one promotional message altogether. In other implementations, process 300 discontinues communicating the one or more phone numbers by omitting communication or display of the one or more phone numbers but continues to communicate the at least one promotional message. In these implementations, the at least one promotional message may be communicated without the one or more phone numbers or otherwise without causing the one or more phone numbers to be displayed.

Returning to operation 308, when the number or rate of phone calls is less than the requested/desired number or rate of phone calls, process 300 may proceed to an operation 310, where process 300 determines a call through rate for the at least one promotional message based on the received one or more calls.

In an operation 312, process 300 may determine a number instances to communicate the one or more phone numbers associated with the at least one promotional message based on the determined call through rate, a predefined number of calls indicated by an entity associated with the at least one promotional message, and/or a desired number of calls determined by call metric system 150. For example, process 300 may determine a number of impressions that includes or otherwise causes display of the one or more phone numbers.

In an operation 314, process 300 may communicate the one or more phone numbers based on the determined number of instances, where process 300 then returns to operation 306. For example, process 300 may determine to communicate the one or more phone numbers a number of instances equal to the determined number. In some implementations, process 300 may be dynamic in that the determined number of instances may change based on the call through rate as more calls are received. In other words, the determined number of instances may change if the call through rate changes based on received calls.

Figure 4:
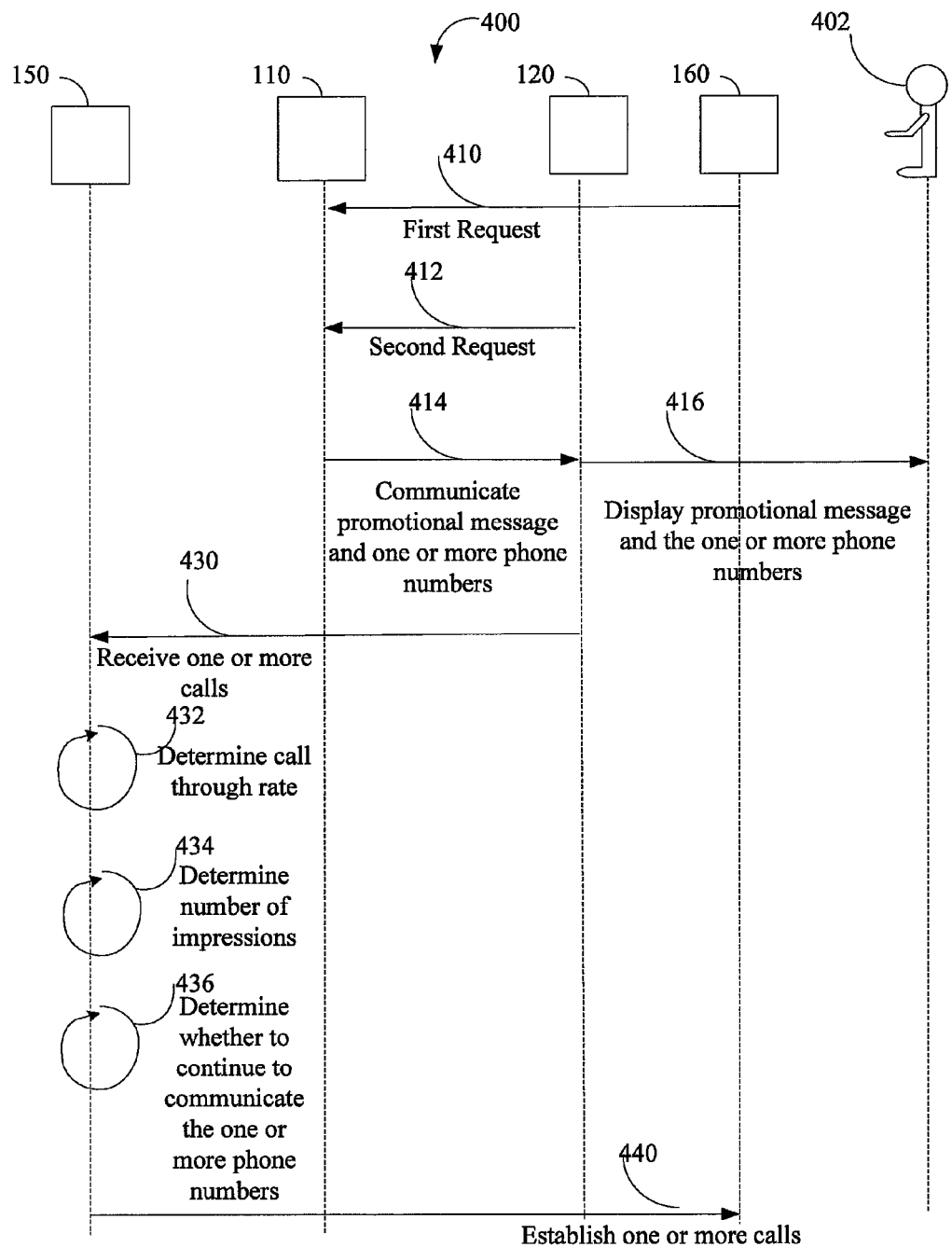
FIG. 4 is a data flow diagram illustrating process relationships in a system of controlling a number of calls based on promotional message impression(s), according to various implementations of the invention.

FIG. 4 is a data flow diagram 400 illustrating example process relationships in a system of controlling a number of calls based on promotional message impression(s), according to various implementations of the invention.

According to various implementations of the invention, in an operation 410, promotional message serving system 110 may receive a first request to communicate at least one promotional message. In some implementations, the first request may be received from an entity (for example, entity 160) associated with the at least one promotional message. In some implementations, entity 160 may include an advertiser, retailer and/or any other entity associated with the at least one promotional message. In other words, entity 160 may include an entity that wishes to communicate a promotional message to a user in response to a search request (for example, using a search engine) from a user.

In some implementations, the at least one promotional message may be associated with one or more phone numbers. In some implementations, the one or more phone numbers may be associated with entity 160 (for example, an advertiser) with which the at least one promotional message is associated. In some implementations, the one or more phone numbers may be mapped to the advertiser's phone numbers. In some implementations, the one or more phone numbers may be associated with a different entity that has knowledge of the advertiser's phone numbers and may map the one or more phone numbers to the advertiser's phone numbers.

In some implementations, in an operation 412, promotional message serving system 110 may receive a second request associated with computing device 120. In some implementations of the invention, the second request includes a request for promotional messages, web pages and/or other electronic content to be communicated to computing device 120. In some implementations, the second request may be related to an application or other process executing at computing device 120. In some implementations, the second request includes one or more search terms (i.e., keywords) from an operator/user 402 of computing device 120 entered into a search engine. The search engine may be a web-based search engine and/or a search engine that searches a hard drive or other component of computing device 120. In some implementations, the second request may be related to an application such as a gaming or other application being displayed at computing device 120.

In some implementations, in an operation 414, promotional message serving system 110 may communicate at least one promotional message and the associated one or more phone numbers to computing device 120. In some implementations, promotional message serving system 110 may communicate the least one promotional message and the associated one or more phone numbers in response to the second request. In some implementations, promotional message serving system 110 may identify the at least one promotional message to be communicated based on the second request. In some implementations, in an operation 416, the at least one promotional message and the one or more phone numbers may be displayed at computing device 120 and may be viewed by user 402 of computing device 120.

In some implementations, user 402 may call the one or more phone numbers associated with the at least one promotional message. In some implementations, in an operation 430, call metric system 150 may receive one or more calls from computing device 120 or other device used by user 402 to make the calls. In some implementations, in an operation 432, call metric system 150 may determine a call through rate for the at least one promotional message/entity based on the received one or more calls.

In some implementations, in an operation 434, call metric system 150 may determine a number of impressions of the at least one promotional message based on the determined call through rate and/or a predefined number of calls indicated by the entity. In some implementations, call metric system 150 may determine how many more impressions should be communicated to computing device 120 based on the determined call through rate and/or the predefined number of calls. In some implementations, call metric system 150 may make a determination to increase or decrease the number of impressions to be communicated based on the determined call through rate and/or the predefined number of calls. In some implementations, call metric system 150 may make a determination to discontinue the communication of at least one impression based on the determined call through rate and/or the predefined number of calls.

In some implementations, in an operation 436, call metric system 150 may determine whether to continue to communicate the one or more phone numbers associated with the at least one promotional message based on the determined call through rate and/or the predefined number of calls. In some implementations, call metric system 150 may determine a number of instances to communicate the one or more phone numbers based on the determined call through rate when the predefined number or rate of calls has not been achieved. In some implementations, call metric system 150 may determine to discontinue communication of the one or more phone numbers when the predefined number of rate of calls has been achieved.

In some implementations, in operation 440, call metric system 150 may establish one or more calls between user 402 and entity 160 based on the received one or more calls.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method comprising:
   identifying a predefined number of calls an entity desires to receive over a selected time interval;
   communicating, a plurality of times, a promotional message and one or more phone numbers associated with the promotional message;
   receiving one or more calls associated with the communicated promotional message and the associated one or more phone numbers;
   determining a call through rate for the communicated promotional message based on the received one or more calls; and
   determining a number of impressions for the communicated promotional message, based on the determined call through rate, to meet the predefined number of calls.

2. The computer-implemented method of claim 1, in which the promotional messages are communicated said plurality of times over a first time period to provide a first number of impressions, and the method further comprises adjusting a rate at which the promotional message and the associated one or more phone numbers are subsequently communicated over a second time period responsive to the determined number of impressions over the first time period.

3. The computer-implemented method of claim 1, wherein said determining a number of impressions for the communicated promotional message further comprises decreasing a rate at which the promotional message is communicated based on the determined call through rate.

4. The computer-implemented method of claim 1, wherein said determining a number of impressions for the communicated promotional message further comprises increasing a rate at which the promotional message is communicated based on the determined call through rate.

5. The computer-implemented method of claim 1, wherein said determining a number of impressions for the communicated promotional message further comprises determining whether to continue communicating the promotional message responsive to the determined number of impressions.

6. The computer-implemented method of claim 1, wherein said determining a number of impressions for the communicated promotional message further comprises discontinuing communication of the promotional message responsive to the determined number of impressions.

7. The computer-implemented method of claim 1, further comprising:
   determining a call quality based on the received one or more calls,
   wherein said determining a number of impressions is further based on the call quality.

8. The computer-implemented method of claim 7, wherein determining a call quality further comprises:
   determining an average wait time for the received one or more calls or a number of disconnected ones of the received one or more calls.

9. The computer-implemented method of claim 1, wherein the request is received from an entity associated with the at least one promotional message.

10. The computer-implemented method of claim 1, further comprising:
    establishing a call between one or more callers associated with the one or more calls and an entity associated with the at least one promotional message.

11. A system comprising one or more processors configured to:
    receive an indication of a predefined number of calls that an entity desires to receive over a first time period;
    communicate a promotional message and one or more associated phone numbers a number of times over a second time period;
    receive one or more calls associated with the communicated promotional message;
    determine a call through rate for the communicated promotional message based on the received one or more calls;
    determine, based on the determined call through rate, a number of impressions required for the promotional message to achieve the predefined number of calls; and
    communicate the promotional message and the associated one or more phone numbers a number of times corresponding to the determined number of impressions over a third time period.

12. The system of claim 11, wherein the rate at which the promotional message is communicated is decreased during the third time period as compared to the second time period.

13. The system of claim 11, wherein the rate at which the promotional message is communicated is increased during the third time period as compared to the second time period.

14. The system of claim 11, wherein the one or more processors configured to determine a number of impressions for the promotional message further comprises one or more processors configured to increase a number of impressions of the promotional message to be communicated based on the determined call through rate.

15. The system of claim 11, wherein the one or more processors configured to determine a number of impressions for the promotional message further comprises one or more processors configured to determine whether to continue to communicate the promotional message.

16. The system of claim 11, wherein the one or more processors configured to determine a number of impressions for the promotional message further comprises one or more processors configured to discontinue at least one impression of the promotional message.

17. The system of claim 11, further comprising one or more processors configured to:
   determine a call quality based on the received one or more calls,
   wherein said determining a number of impressions is further based on the call quality.

18. The system of claim 17, wherein the one or more processors configured to determine a call quality further comprises one or more processors configured to:
   determine an average wait time for the received one or more calls or a number of disconnected ones of the received one or more calls.

19. The system of claim 11, wherein the request is received from an entity associated with the at least one promotional message.

20. The system of claim 11, wherein the one or more processors are further configured to:
   establish a call between one or more callers associated with the one or more calls and an entity associated with the at least one promotional message.

21. A computer-implemented method comprising:
   receiving a request to communicate at least one promotional message a plurality of different times in a time period, wherein the at least one promotional message is associated with one or more phone numbers, and wherein the request comprises a number or rate of calls to be received resulting from the at least one promotional message;
   communicating the at least one promotional message and the one or more phone numbers;
   receiving one or more calls associated with the at least one promotional message;
   determining whether the requested number or rate of calls has been achieved based on the one or more calls; and
   determining a call through rate for the at least one promotional message based on the received one or more calls; and
   determining a number of instances to subsequently communicate the promotional message and the one or more phone numbers based on the determined call through rate when the requested number or rate of calls has not been achieved.

22. The computer-implemented method of claim 21, further comprising:
   communicating the one or more phone numbers based on the determined number of instances.

23. The computer-implemented method of claim 21, further comprising:
   discontinuing the communication of the one or more phone numbers when the requested number or rate of calls has been achieved.

24. The computer-implemented method of claim 23, wherein said discontinuing the communication of the one or more phone numbers further comprising:
   discontinuing communication of the at least one promotional message.

25. The computer-implemented method of claim 23, wherein said discontinuing the communication of the one or more phone numbers further comprising:
   omitting communication of the one or more phone numbers while continuing to communicate the at least one promotional message.

* * * * *